United States Patent [19]

Betz et al.

[11] Patent Number: 5,034,450
[45] Date of Patent: Jul. 23, 1991

[54] THERMOPLASTIC MOLDING MATERIALS BASED ON POLYAMIDES AND POLYESTER ELASTOMERS

[75] Inventors: Walter Betz, Ludwigshafen; Christoph Plachetta, Limburgerhof; Eckhard M. Koch, Fussgoenheim; Gerd Blinne, Bobenheim; Gunter Pipper, Bad Duekheim, all of Fed. Rep. of Germany

[73] Assignee: BASF Aktiengesellschaft, Ludwigshafen, Fed. Rep. of Germany

[21] Appl. No.: 315,141

[22] Filed: Feb. 24, 1989

[30] Foreign Application Priority Data

Feb. 27, 1988 [DE] Fed. Rep. of Germany ....... 3806271

[51] Int. Cl.$^5$ .......................... C08L 77/00; C08K 7/04
[52] U.S. Cl. ...................................... 524/538; 525/425
[58] Field of Search ........................ 525/425; 524/538

[56] References Cited

U.S. PATENT DOCUMENTS

| | | |
|---|---|---|
| 2,071,250 | 2/1937 | Carothers . |
| 2,071,251 | 2/1937 | Carothers . |
| 2,130,523 | 9/1938 | Carothers . |
| 2,130,948 | 9/1988 | Carothers . |
| 2,241,322 | 5/1941 | Hanford . |
| 2,312,966 | 3/1943 | Hanford . |
| 2,512,606 | 6/1950 | Bolton et al. . |
| 3,393,210 | 7/1968 | Speck . |
| 3,651,014 | 3/1972 | Witsiepe . |
| 3,742,916 | 7/1973 | Wessberg et al. . |
| 3,784,520 | 1/1974 | Hoeschele . |
| 3,845,163 | 10/1974 | Murch . |
| 4,136,090 | 1/1979 | Hoeschele . |
| 4,185,003 | 1/1980 | Hoeschele . |
| 4,414,358 | 11/1983 | Nield et al. ........................ 524/538 |
| 4,415,699 | 11/1983 | Nield et al. ........................ 524/538 |

FOREIGN PATENT DOCUMENTS

| | | |
|---|---|---|
| 69823 | 5/1981 | European Pat. Off. . |
| A4141 | 11/1982 | European Pat. Off. . |
| 96264 | 12/1983 | European Pat. Off. . |
| 1241606 | 7/1965 | Fed. Rep. of Germany . |
| 1138922 | 3/1971 | Fed. Rep. of Germany . |
| 1669702 | 3/1971 | Fed. Rep. of Germany . |
| 2713537 | 9/1978 | Fed. Rep. of Germany . |
| 1504113 | 11/1966 | France . |
| 60-106854 | 6/1985 | Japan . |

OTHER PUBLICATIONS

Polymer Engineering and Science, Dec. 1974, vol. 14, No. 12, pp. 848-852.

*Primary Examiner*—Ana L. Carrillo
*Attorney, Agent, or Firm*—Oblon, Spivak, McClelland, Maier & Neustadt

[57] ABSTRACT

Thermoplastic molding materials contain, as essential components,

A) from 40 to 99.5% by weight of a thermoplastic polyamide,

B) from 0.5 to 15% by weight of a thermoplastic polyester elastomer and furthermore C) from 0 to 50% by weight of fibrous or particulate fillers or a mixture of these.

4 Claims, No Drawings

THERMOPLASTIC MOLDING MATERIALS BASED ON POLYAMIDES AND POLYESTER ELASTOMERS

The present invention relates to thermoplastic molding materials containing, as essential components,
A) from 40 to 99.5% by weight of a thermoplastic polyamide,
B) from 0.5 to 15% by weight of a thermoplastic polyester elastomer
and furthermore
C) from 0 to 50% by weight of fibrous or particulate fillers or a mixture of these.

The present invention furthermore relates to the use of such molding materials for the production of moldings, and to moldings obtainable using such molding materials as essential components.

In the anhydrous state, in particular the moldings produced from high crystalline polyamides of medium molecular weight are relatively sensitive to impact. There is therefore a need for rapidly processible, free-flowing polyamide plastics from which it is possible to produce, in particular, moldings which have increased impact strength in the dry state. Polyamides which simultaneously have high tensile strength, good heat distortion resistance, good resistance to solvents, good processibility, high impact strength and good flexibility are of particular interest.

It is known that the impact strength and flexibility of polymers can be improved by mixing low molecular weight plasticizers into polyamides. However, this does not lead to satisfactory solutions. The majority of plasticizers suitable for plastics are not sufficiently compatible with polyamides and separate out during processing, or the plasticizers tend to exude from the plastic. Plasticizers which form true solutions with polyamides generally have adverse effects on the mechanical properties of the polyamides. Although high polar substances having a low molecular weight, such as water and dimethylformamide, effect good plasticization, they cannot be incorporated into the moldings until after the latter have been produced, since otherwise bubble-containing moldings would form during processing of the pretreated polyamide granules, owing to the relatively low boiling points of these plasticizers. Furthermore, owing to their high vapor pressure, such plasticizers escape from the treated polyamide molding.

DE-A 1 138 922 discloses that the impact strength of polyamides can be improved by admixing polymeric substances, such as polyethylene and copolymers of vinyl acetate and ethylene. As a result of partial separation which occurs during processing, moldings produced from such molding materials tend to exhibit stress whitening.

Polyethylenes which contain acidic groups, for example copolymers of ethylene and unsaturated acids or ethylene grafted with unsaturated acids, can be mixed into polyamides to improve the impact strength. Such blends are more finely dispersed and exhibit less stress whitening than the blends described above but, apart from the somewhat improved toughness, have considerably poorer mechanical properties, in particular modulus of elasticity, tensile strength, hardness and rigidity, than the polyamides themselves.

According to U.S. Pat. No. 3,742,916 and DE-B-1 669 702, a certain improvement is achieved by using copolymers of ethylene and tertiary acrylates or methacrylates and mixing these with polyamides. However, these products have unsatisfactory thermal stability. The same applies to the notched impact strength immediately after injection molding. The same disadvantage is associated with the blends disclosed in U.S. Pat. No. 3,845,163 and FR-A-1 504 113, these blends having additional disadvantages owing to the (meth)acrylic acid present in them in some cases in the form of a salt. For example, the tracking resistance in the presence of metals is known to decrease very sharply, so that such products can scarcely be used in the electrical industry. Moreover, most of the metal ions used for neutralization are physiologically unacceptable. Thus, such products would not permitted to be used either in the food packaging sector or as toys.

Copolymers of ethylene, acrylic acid and/or methacrylic acid, and acrylates and/or methacrylates, as elasticizing components, have also been added to polyamides (cf. DE-A 1 241 606). This results in an improvement in the impact strength of the polyamides, which, however, is still not satisfactory for some applications.

DE-A-27 13 537 describes products which have a high impact strength and where tertiary copolymers of ethylene, 4% by weight of acrylic acid and ethyl or tertbutyl acrylate have been mixed into the polyamide, as impact modifiers. The polyamide used must have a relative viscosity of not less than 3.5. Because of their inadequate flow behavior, such products are very difficult to process.

Finally, EP-A 96264 describes blends of polyamides and terpolymers of ethylene, n-butyl acrylate and a monomer having acid functional groups or latent acid functional groups, as elasticizing components. However, the reproducibility of the impact strength at low temperatures, particularly in complicated moldings, still does not give completely satisfactory results.

The prior art blends frequently also give rise to the problem that, owing to the addition of significant amounts (>10% by weight) of polymeric impact modifiers, the modulus of elasticity (i.e. the rigidity) is adversely affected.

It is an object of the present invention to provide thermoplastic molding materials which have a good overall spectrum of mechanical properties and in particular good reproducibility of the impact strength properties even at low temperatures, particularly in measurements carried out on moldings produced from the molding materials. Moreover, the rigidity and the flow properties should as far as possible not be adversely affected.

We have found that this object is achieved, according to the invention, by the thermoplastic molding materials defined at the outset.

Preferred materials of this type are described in the subclaims.

The polyamides present as component A) in the materials are known per se and include the semicrystalline and amorphous resins which have weight average molecular weights of not less than 5,000 and are usually referred to as nylon. Such polyamides are described in, for example, U.S. Pat. Nos. 2,071,250, 2,071,251, 2,130,523, 2,130,948, 2,241,322, 2,312,966, 2,512,606 and 3,393,210.

The polyamides can be prepared, for example, by condensation of equimolar amounts of a saturated or of an aromatic dicarboxylic acid of 4 to 12 carbon atoms and a diamine of not more than 14 carbon atoms, or by condensation of ω-aminocarboxylic acids or polyaddition of lactams. Examples of polyamides are polyhexamethyleneadipamide (nylon 66), polyhexamethyleneazelaamide (nylon 69), polyhexamethylenesebacamide (nylon 610), polyhexamethylenedodecanediamide (nylon 612), the polyamides obtained by subjecting lactams to ring-opening, such as polycaprolactam or polylaurolactam, and poly-11-aminoundecanoic acid and a polyamide of di-(p-aminocyclohexyl)-methane and dodecanedioic acid. According to the invention, it is also possible to use polyamides which have been prepared by copolycondensation of two or more of the above-mentioned polymers or their components, for example a copolymer of adipic acid, isophthalic acid or terephthalic acid and hexamethylenediamine or copolymers of caprolactam, terephthalic acid and hexamethylenediamine. The polyamides are preferably linear and have melting points greater than 200° C.

Preferred polyamides are polyhexamethyleneadipamide, polyhexamethylenesebacamide and polycaprolactam. The polyamides generally have a relative viscosity of from 2.5 to 5, determined in a 1% strength by weight solution in 96% strength sulfuric acid at 23° C., corresponding to a molecular weight of about 15,000–45,000. Polyamides having a relative viscosity of from 2.5 to 3.5, in particular from 2.6 to 3.4, are preferably used.

The novel molding materials contain from 40 to 99.5, preferably from 50 to 99, in particular from 60 to 98, % by weight of the polyamides A).

The novel thermoplastic molding materials contain, as component B, from 0.5 to 15, in particular from 1 to 12, particularly preferably from 1 to 5, % by weight, based on the total weight of the molding materials, of a thermoplastic polyester elastomer.

Polyester elastomers are understood as being segmented copolyether-esters which contain long-chain segments derived, as a rule, from poly(alkylene) ether glycols and short-chain segments derived from low molecular weight diols and dicarboxylic acids.

Products of this type are known per se and are described in the literature. Merely by way of example, reference may be made in this context to U.S. Pat. Nos. 3,651,014, 3,784,520, 4,185,003 and 4,136,090 and to a few publications by G. K. Hoeschele (Chimia 28 (9) (1974), 544; Angew. Makromolek. Chemie 58/59 (1977), 299–319, and Pol. Eng. Sci. (1974), 848). Appropriate products are also available commercially under the names Hytrel ® (DuPont), Arnitel ® (Akzo) and Pelprene ® (Toyobo Co. Ltd.).

Very generally, thermoplastic copolyether-elastomers consist of long-chain segments of the general formula

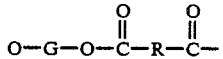

and short-chain segments of the general formula

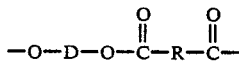

where G is a divalent radical formed after removal of the terminal hydroxyl groups from a poly(alkylene oxide) glycol having a molecular weight of preferably from 400 to 6,000, in particular from 600 to 4,000, D is a divalent radical formed after removal of the terminal hydroxyl groups from a low molecular weight diol having a molecular weight of preferably less than 250 and R is a divalent radical formed after removal of the carboxyl groups from a dicarboxylic acid having a molecular weight of preferably less than 300.

It is of course also possible to use mixtures of a plurality of poly(alkylene oxide) glycols, of a plurality of diols or of a plurality of dicarboxylic acids.

The poly(alkylene oxide) glycols HO—G—OH preferably have a melting point of less than 55° C. and a carbon/oxygen ratio of preferably from 2 to 10, in particular from 2 to 6.

Examples of poly(alkylene oxide) glycols are poly(ethylene oxide) glycol, poly(1,2-propylene oxide) glycol, poly(1,3-propylene oxide) glycol, poly(1,2-butylene oxide) glycol, poly(1,3-butylene oxide) glycol, poly(1,4-butylene oxide) glycol, poly(pentamethylene oxide) glycol, poly(hexamethylene oxide) glycol, poly-(heptamethylene oxide) glycol, poly(octamethylene oxide) glycol, poly(nonamethylene oxide) glycol and random or block copolymers of different glycols from among those stated above. Poly(ethylene oxide) glycol, poly(1,2-propylene oxide) glycol, poly(1,3-propylene oxide) glycol and poly(1,4-butylene oxide) glycol and mixtures of these are preferred. The amount of the long-chain segments, which are derived from the above polyalkylene oxide glycols and dicarboxylic acids, is in general from 5 to 70, preferably from 7 to 50, % by weight, based on the total weight of component B.

Suitable diols HO—D—OH very generally are low molecular weight diols having molecular weights of, preferably, less than 250. These may have linear or branched, cycloaliphatic or aromatic basic structures.

Diols of 2 to 15 carbon atoms are preferred. Ethane-1,2-diol, propane-1,3-diol, propane-1,2-diol, butane-1,4-diol, butane-1,3-diol, butane-1,2-diol, pentane-1,5-diol, 2,2-dimethylpropane-1,3-diol, hexane-1,6-diol and its isomers, decamethylenediol, the isomeric dihydroxycyclohexanes, resorcinol, hydroquinone and the various dihydroxynaphthalenes may be mentioned here merely by way of example. Among these, aliphatic diols of 2 to 8, in particular 2 to 4, carbon atoms are particularly preferred (ethane-1,2-diol, propane-1,3-diol and butane-1,4-diol).

In some cases, unsaturated diols have also proven suitable, for example but-2-ene-1,4-diol, in particular as a mixture with the abovementioned saturated diols. Examples of polyether-esters obtained from such mixtures are described in EP-A 49 823.

Finally, diphenols, such as 4,4-dihydroxydiphenyl, di-(4-hydroxyphenyl)-methane and 2,2-di-(4-hydroxyphenyl)-propane (frequently referred to as bisphenol A) are further examples of diols.

Instead of the diols, it is of course also possible to use their ester-forming derivatives; in this case, the molecular weight can of course also be higher than 250, depending on the type of derivative, since the preferred molecular weight range (MW <250) relates to the diols themselves.

The dicarboxylic acids HOOC—R—COOH preferably have molecular weights of less than 300 and may be aromatic, aliphatic or cycloaliphatic. The dicarboxylic acids may also possess substituents which do not interfere with the polymerization reaction.

Examples of aromatic dicarboxylic acids are terephthalic acid, isophthalic acid, substituted dicarboxylic acids of the general formula

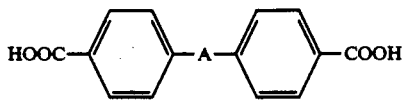

where A is a chemical bond, alkylene of 1 to 3 carbon atoms, —CO—, —S— or —SO$_2$—, 1,5-, 2,6- and 2,7-naphthalenedicarboyxlic acid and their $C_1$-$C_6$-alkyl-substituted derivatives. Among these, terephthalic acid, isophthalic acid, mixtures of these and mixtures of terephthalic or isophthalic acid with other dicarboxylic acids are preferred.

Examples of aliphatic dicarboxylic acids which may be used are oxalic acid, fumaric acid, maleic acid, citraconic acid, sebacic acid, adipic acid, glutaric acid, succinic acid and azelaic acid, to mention but a few.

It is of course also possible to use mixtures of different aliphatic dicarboxylic acids. As in the case of the diols, ester-forming derivatives of the acids can be used instead of the acids themselves. In some cases, this has also proven particularly advantageous.

Regarding further long-chain glycols HO—G—OH, short-chain diols HO—D—OH and dicarboxylic acids HOOC—R—COOH, reference may be made to U.S. Pat. No. 3,651,014.

A stated above, the amount of long-chain segments is in general from 5 to 70, preferably from 7 to 50, % by weight, and the amount of short-chain segments is accordingly from 30 to 95, preferably from 50 to 93, % by weight. The proportion by weight of the particular segments influences, inter alia, the hardness of the products.

The dicarboxylic acids in the long-chain and short-chain segments may be identical or different; in the preparation of the long-chain or short-chain segments, it is also possible to use mixtures of diols or dicarboxylic acids.

The above statements show that a large number of different segmented co(polyether-esters) can be used as component B. Among these, copolyether-esters whose long-chain units are derived from poly(1,4-alkylene oxide) glycol having a molecular weight of from 600 to 2,000, terephthalic acid and butane-1,4-diol are preferred.

In some cases, it has proven advantageous to replace some of the terephthalic acid with isophthalic acid, adipic acid or sebacic acid, or some of the butane-1,4-diol with other diols, e.g. propane-1,3-diol, pentane-1,5-diol or but-2-ene-1,4-diol. Products of this type are described in U.S. Pat. No. 3,651,041 and EP-A 49 823.

Processes for the preparation of segmented co-(polyether-esters) are known per se and are described in the literature, so that further information is unnecessary here. Reference is merely made here to U.S. Pat. Nos. 3,651,014, and U.S. Pat. No. 3,784,520 and a review article by G. K. Hoeschele (Chimia 28 (1974), 544).

The co(polyether-esters) B may contain heat stabilizers or antioxidants, as described in, for example, U.S. Pat. Nos. 4,136,090 and 4,185,003 and in an article by G. K. Hoeschele (Angew. Makromol. Chemie 58/59 (1977), 299–319).

In addition to the components A) and B), the novel thermoplastic molding materials may contain conventional additives and processing assistants, such as stabilizers, antioxidants, heat stabilizers and UV stabilizers, lubricants and mold release agents, colorants, such as dyes and pigments, fibrous and particulate fillers and reinforcing agents, nucleating agents, plasticizers, etc., whose amount as a rule is not more than 50% by weight, based on the total weight of the molding materials.

The stabilizers can be added to the thermoplastic molding materials at any stage of their preparation, but are preferably added as early as possible in order to prevent decomposition beginning before the stabilizer has been incorporated. Examples of antioxidants and stabilizers are halides of metals of group I of the Periodic Table, for example sodium halides, potassium halides and/or lithium halides, if necessary in conjunction with copper(I) halides, for example chloride, bromide or iodide, sterically hindered phenols, hydroquinones, various substituted members of these groups and mixtures of these compounds, in concentrations of not more than 1% by weight, based on the weight of the thermoplastic molding material.

Examples of UV stabilizers, which are used in general in amounts of not more than 2% by weight, based on the molding material, are various substituted resorcinols, salicylates, benzotriazoles and benzophenones.

Lubricants and mold release agents are added to the molding material as a rule in amounts of not more than 1% by weight, based on the total weight. Examples of these are stearic acid, stearyl alcohol and stearamides.

Organic dyes, such as nigrosine, and pigments, such as titanium dioxide, cadmium sulfide, cadmium selenide, phthalocyanines, ultramarine blue and carbon black, can be added as colorants, and fibrous and particulate fillers and reinforcing agents may also be added. Examples of the latter are carbon fibers, glass fibers, amorphous silica, asbestos, calcium silicate, aluminum silicate, magnesium carbonate, kaolin, chalk, powdered quartz, mica and feldspar. The amount of such fillers and colorants is in general not more than 50% by weight, based on the total weight of the molding materials.

Suitable nucleating agents are, for example, talc, calcium fluoride, sodium phenylphosphinate, alumina and finely divided polytetrafluoroethylene.

Examples of plasticizers are dioctyl phthalate, dibenzyl phthalate, butyl benzyl phthalate, hydrocarbon oils, N-(n-butyl)-benzenesulfonamide and o- and p-tolylethylsulfonamide.

Further additives which may be added are all flameproofing agents known for polyamides, in particular such flameproofing agents based on phosphorus compounds or red phosphorus itself.

The novel molding materials can be prepared by a conventional process, for example by mixing in the melt at elevated temperatures. Extruders, for example single-screw or twin-screw extruders, or other conventional plasticizing apparatuses, such as Brabender mills or Banbury mills, are advantageously used for this purpose. However, the preparation can also be carried out by precipitating the components together from a solution or by mixing or dry blending the components and then extruding the dry mixture.

The novel molding materials are suitable for processing by injection molding or extrusion, particularly for the production of tough heat-stable shaped articles for all kinds of industrial purposes, which are subjected to high stress.

In this context, the good impact strength at low temperatures, coupled with good flow properties and good rigidity, is particularly advantageous.

EXAMPLE

Component A

Polyhexamethyleneadipamide having a relative viscosity of 2.6, measured in 96% strength $H_2SO_4$ at 25° C. and at a concentration of 1 g/100 ml (Ultramid ® A3 from BASF AG)

Component B

Hytrel ® 4056 (copolyether-ester essentially consisting of units derived from poly(1,4-butylene glycol), terephthalic acid and butane-1,4-diol) having a Shore hardness of 92 A or 40 D (according to ASTM D-2240) and a melt flow index of from 4 to 6.5 g/10 min (190° C., 2.16 kg load) (manufacturer: DuPont de Nemours and Company)

98% by weight of Ultramid ® A3 and 2% by weight of Hytrel 4056 were mixed and melted at 280° C. in a twin-screw extruder and then extruded into a water bath. After granulation and drying, the blend was injection molded to give circular disks having a diameter of 60 mm and a thickness of 2 mm. These moldings were used to carry out the falling bolt test and to determine the penetration energy (impact strength) according to DIN 53,443, Part 2, the modulus of elasticity according to DIN 53,457 and the shortest possible cycle time in a test mold.

The results are shown below.

| Example | Falling bolt test W50 [Nm] | Penetration energy DIN 53,443 [Nm] 23° C. | Penetration energy DIN 53,443 [Nm] −20° C. | Modulus of elasticity | Shortest cycle time (in test mold) |
|---|---|---|---|---|---|
| Comparison (100% of Ultramid ® A3) | 30 | 74(pV)[1] | 10(b)[2] | 3000 | 39 |
| 1 | 92 | 135(pV) | 110(b) | 2800 | 26 |

[1] pV = Plastic deformation during penetration
[2] b = Brittle fracture during penetration These results impressively demonstrate that the impact strength and the processability of polyamides are substantially improved with the addition of only 2% of a polyester elastomer.

We claim:

1. A thermoplastic molding material consisting of
   A) from 50 to 99% by weight of a thermoplastic polyamide of a melting point greater than 200° C.,
   B) from 1 to 5% by weight of a thermoplastic polyester elastomer comprising a segmented copolyether-ester containing long-chain segments derived from poly(alkylene) ether glycols and short-chain segments derived from diols,
   and furthermore
   C) from 0 to 50% by weight of fibrous or particulate fillers or a mixture of these, stabilizers, antioxidants, lubricants, mold release agents or colorants.

2. A thermoplastic molding material as claimed in claim 1, wherein component B consists of units

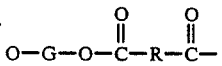

and

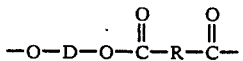

where G is a divalent radical which remains after removal of the terminal hydroxyl groups from a poly(alkylene oxide) glycol having a molecular weight of from 400 to 6000, D is a divalent radical which remains after removal of the terminal hydroxyl groups from a divalent diol having a molecular weight of less than 250, and R is a divalent radical which remains after removal of the carboxyl groups from a dicarboxylic acid.

3. A molding obtained from a thermoplastic molding material as claimed in claim 1 as an essential component.

4. A molding obtained from a thermoplastic molding material as claimed in claim 2 as an essential component.

* * * * *